United States Patent
Fukami et al.

(10) Patent No.: US 7,246,196 B2
(45) Date of Patent: Jul. 17, 2007

(54) DATA RECORDING DEVICE AND METHOD TO CONTINUOUSLY WRITE DATA ACROSS MEMORIES WITHOUT DATA OMISSION

(75) Inventors: Yoichi Fukami, Osaka (JP); Yoshimasa Ono, Osaka (JP)

(73) Assignees: Sanyo Electric Co., Ltd., Moriguchi-Shi (JP); Sanyo Technosound Co., Ltd., Daito-Shi (JP)

( * ) Notice: Subject to any disclaimer, the term of this patent is extended or adjusted under 35 U.S.C. 154(b) by 302 days.

(21) Appl. No.: 11/097,129

(22) Filed: Apr. 4, 2005

(65) Prior Publication Data

US 2005/0223159 A1 Oct. 6, 2005

(30) Foreign Application Priority Data

Apr. 5, 2004 (JP) .............................. 2004-110919

(51) Int. Cl.
*G06F 12/00* (2006.01)
(52) U.S. Cl. ........................ 711/103; 711/170
(58) Field of Classification Search ................ 711/103, 711/170
See application file for complete search history.

(56) References Cited

U.S. PATENT DOCUMENTS 6,418,506 B1 * 7/2002 Pashley et al. ............. 711/103

FOREIGN PATENT DOCUMENTS

JP 2001-5496 1/2001
JP 2003-348392 12/2003

* cited by examiner

*Primary Examiner*—Joseph Del Sole
*Assistant Examiner*—Eric Loonan
(74) *Attorney, Agent, or Firm*—Armstrong, Kratz, Quintos, Hanson & Brooks LLP

(57) ABSTRACT

The present invention provides a data recording device which starts recording data a to a memory A when a command is given to start recording data. When the remaining capacity of the memory A is not greater than a given capacity value x, data recording to the memory A is concurrent with data recording to a memory B. When the capacity of the memory A is full, recording data x to the memory A is ceased. Thereafter, when a command is given to cease an operation for recording data to the memory B, an inquiry is made as to whether space capacity of the memory B is greater than an amount of data a of the memory A. Only when the inquiry is answered in the affirmative, the data a recorded on the memory A is copied to the memory B.

4 Claims, 4 Drawing Sheets

DATA RECORDING DEVICE AND METHOD TO CONTINUOUSLY WRITE DATA ACROSS MEMORIES WITHOUT DATA OMISSION

BACKGROUND OF THE INVENTION

1. Field of the Invention

The present invention relates to digital data recording devices for IC recorders and digital cameras, etc.

2. Description of Related Art

The data recording device of this type is heretofore provided with an incorporated memory and is connectable to a removable external memory such as a memory card, etc. When the incorporated memory becomes full in capacity during data recording, data recording is automatically suspended. If the device is connected to the external memory, the user performs a manipulation for recording the data to the external memory, whereby the data recording memory can be changed over from the incorporated memory to the external memory.

There arises, however, the following problem. When the user performs a manipulation for changing over the data recording memory from the incorporated memory to the external memory, data to be recorded has an omission during a period after the suspension of data recording for the incorporated memory until data recording is started for the external memory, entailing the problem that the omitted data amount is increased corresponding to a period of time taken for the manipulation by the user. Accordingly a digital camera has been proposed for automatically changing over from the incorporated memory to the external memory (JP-A No. 348392/2003).

With the data recording device for automatically changing over from the incorporated memory to the external memory, however, changeover inevitably involves a slight data omission. Furthermore, the data recorded on the incorporated memory and the data recorded on the external memory are managed as separate files. This entails the problem of inconvenient data handling.

SUMMARY OF THE INVENTION

An object of the present invention is to provide a data recording device capable of recording a series of data continuously on a plurality of storage media without an omission. Furthermore, with the data recording device, the data is handled with ease.

The present invention provides a data recording device having incorporated therein or connectable thereto a plurality of storage media for digital-recording video data and/or sound data, and comprising an input device for giving a command to start and cease recording data and a control circuit for controlling data recording to the plurality of storage media.

The control circuit comprises:

means for starting recording data to one storage medium A at a first point of time when a command is given to start recording data;

first judging means for judging whether the remaining capacity of the one storage medium A is not greater than a given capacity value x during data recording to the one storage medium A;

first control means for starting recording data to another storage medium B at a second point of time when it is judged that the remaining capacity of the one storage medium A is not greater than a given capacity value x, concurrently with the data recording to the one storage medium A;

second control means for terminating recording of data to the one storage medium A at a third point of time when a capacity of the one storage medium A is full or is not greater than a given capacity;

second judging means for judging whether, at a fourth point of time when a command is given to cease recording the data or data recording is automatically ceased to said another storage medium B, space capacity of said another storage medium B is greater than a data amount recorded on the one storage medium A from the first point of time to the second point of time; and third control means for, when it is judged that space capacity of said another storage medium B is greater than a data amount recorded on the one storage medium A, copying automatically or in response to a user's command the data recorded on the one storage medium A from the first point of time to the second point of time to said another storage medium B, and managing a series of data from the first point of time to the fourth point of time as one file.

With the data recording device of the present invention, when the capacity of the one storage medium A in data recording becomes full, data recording is automatically changed over to said another storage medium B. In this case, the data from the second point of time to the third point of time is recorded as overlapped on the two storage media A and B. When the data recorded on the one storage medium A is copied to said another storage medium B, overlapped data recorded on one of the two storage media is erased, storing the series of data from the first point of time to the fourth point of time in said another storage medium B without an overlap and omission, to thereby manage the series of data as one file.

Stated specifically, the third control means copies the data to said another storage medium B, and thereafter erases the data from the first point of time to the third point of time recorded on the one storage medium A. This increases storage capacity of the storage medium A.

Stated further specifically, when it is judged that space capacity of said another storage medium B is greater than a data amount recorded on the one storage medium A, in response to the user's command not to couple the data together as one file, the third control means manages as one file the data from the first point of time to the third point of time recorded on the one storage medium A, and erases the data from the second point of time to the third point of time recorded on said another storage medium B to manage the data from the third point of time to the fourth point of time as one file. This arrangement allows data recording continuously on two storage media when required, as conventionally.

Stated still further specifically, when a command is given to cease data recording while data is recorded to said another storage medium B during a period from the second point of time to the third point of time, the first control means erases the data recorded on said another storage medium B from the second point of time, to cease recording data to the two storage media A and B. According to the specific construction, in the case where data to be recorded is small and all of a series of data can be recorded on the one storage medium A, useless data recording to said another storage medium B can be prevented.

As described above, with the data recording device of the present invention, a series of data can be recorded continuously on a plurality of storage media without an omission, and the series of data as one file can be handled with ease.

DETAILED DESCRIPTION OF THE INVENTION

Figure 1:
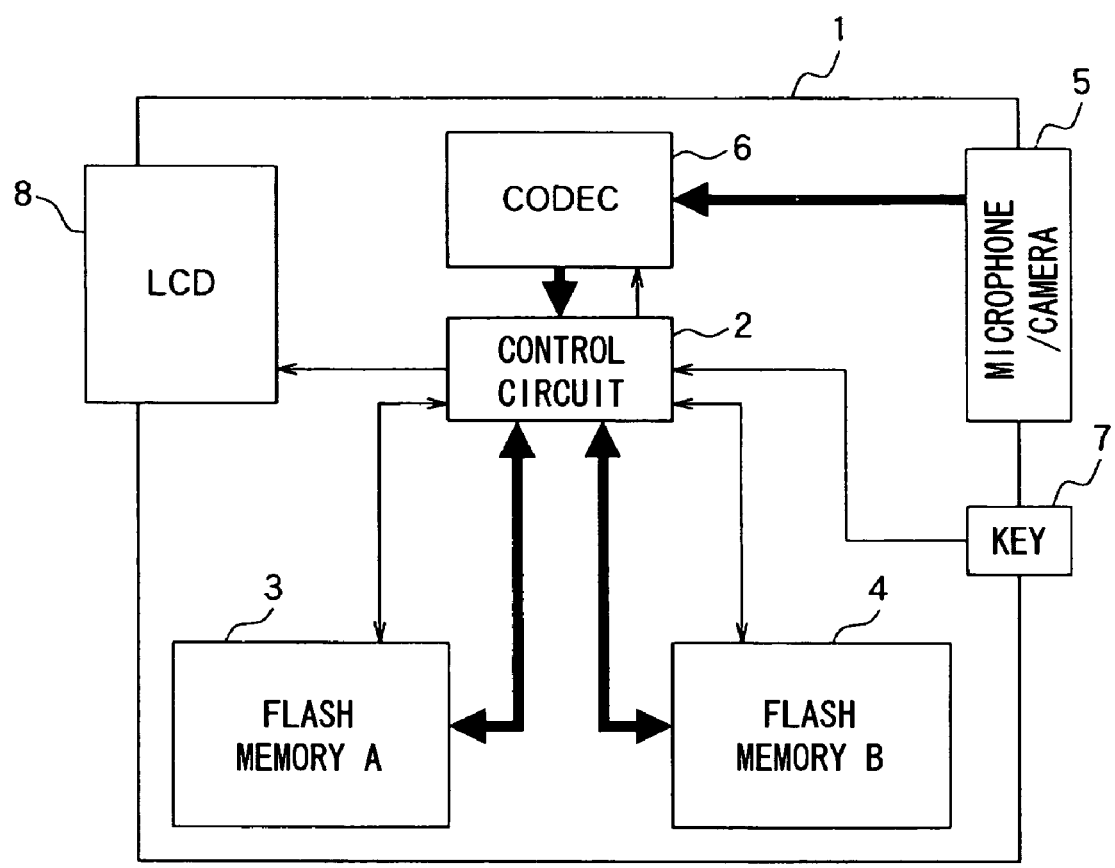
FIG. 1 is a block diagram illustrating a construction of a data recording device according to the present invention.

An embodiment of the present invention will be described below with reference to the drawings. A data recording device 1 embodying the present invention, as seen in FIG. 1, includes a control circuit 2 having a microcomputer. Connected to the control circuit 2 are a flash memory A 3 serving as an incorporated memory, for example, and a flash memory B 4 serving as an external memory, for example.

The data recording device 1 is provided with a microphone and a camera 5. Voice signals and video signals input from the microphone and the camera 5 are fed to a modulation/demodulation circuit 6 and are converted into digital voice data and video data. Furthermore, the data recording device 1 is provided with a liquid crystal display 8 for displaying video image and a key input device 7 for the user to give a data recording command.

The manipulation of the key input device 7 of the data recording device 1 described allows recording, as digital data, the voice signals or video signals input from the microphone or the camera 5 on the flash memory A3 or flash memory B4.

Figure 2:
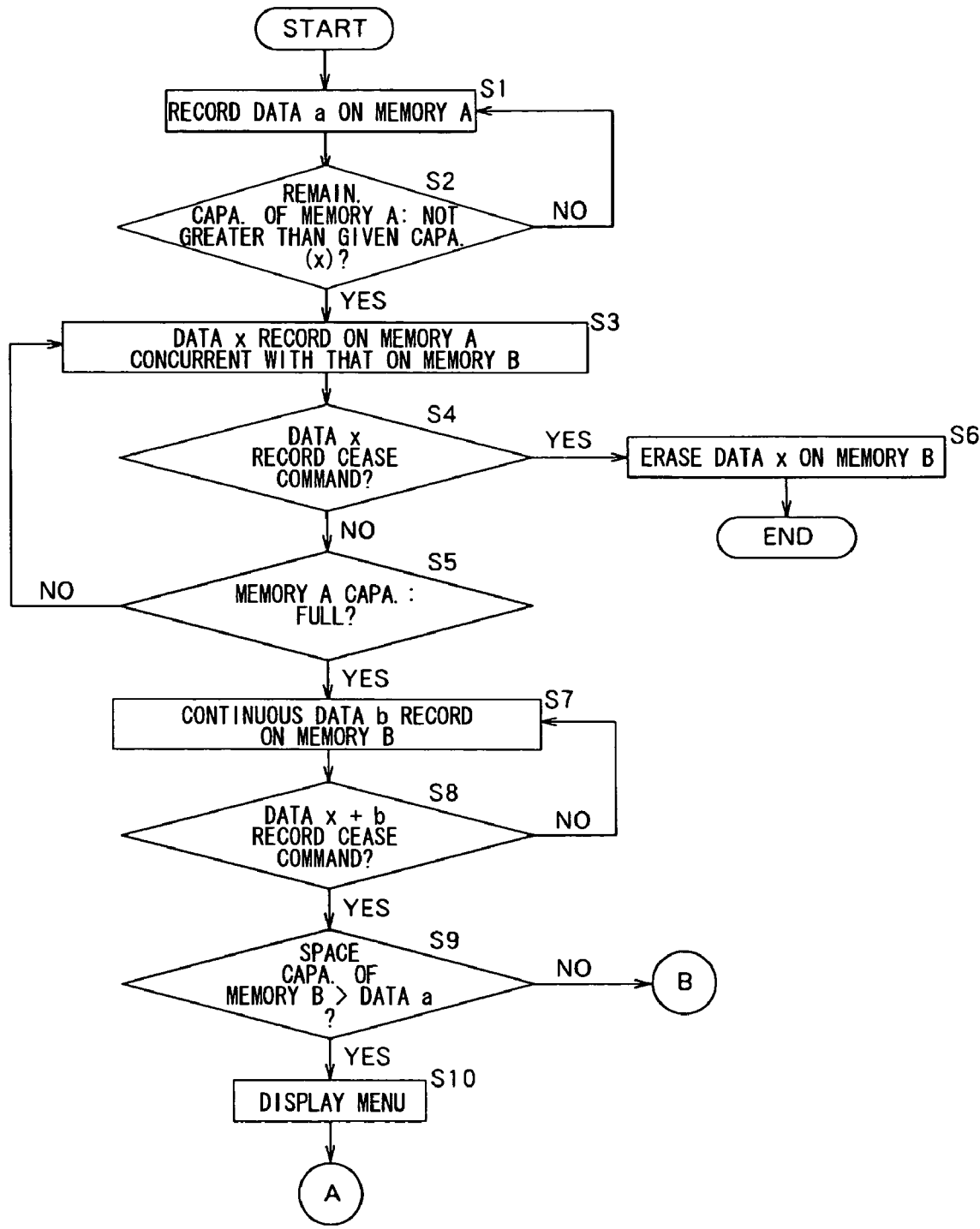
FIG. 2 is a flowchart showing a first half part of a data recording control procedure of the data recording device.
Figure 3:
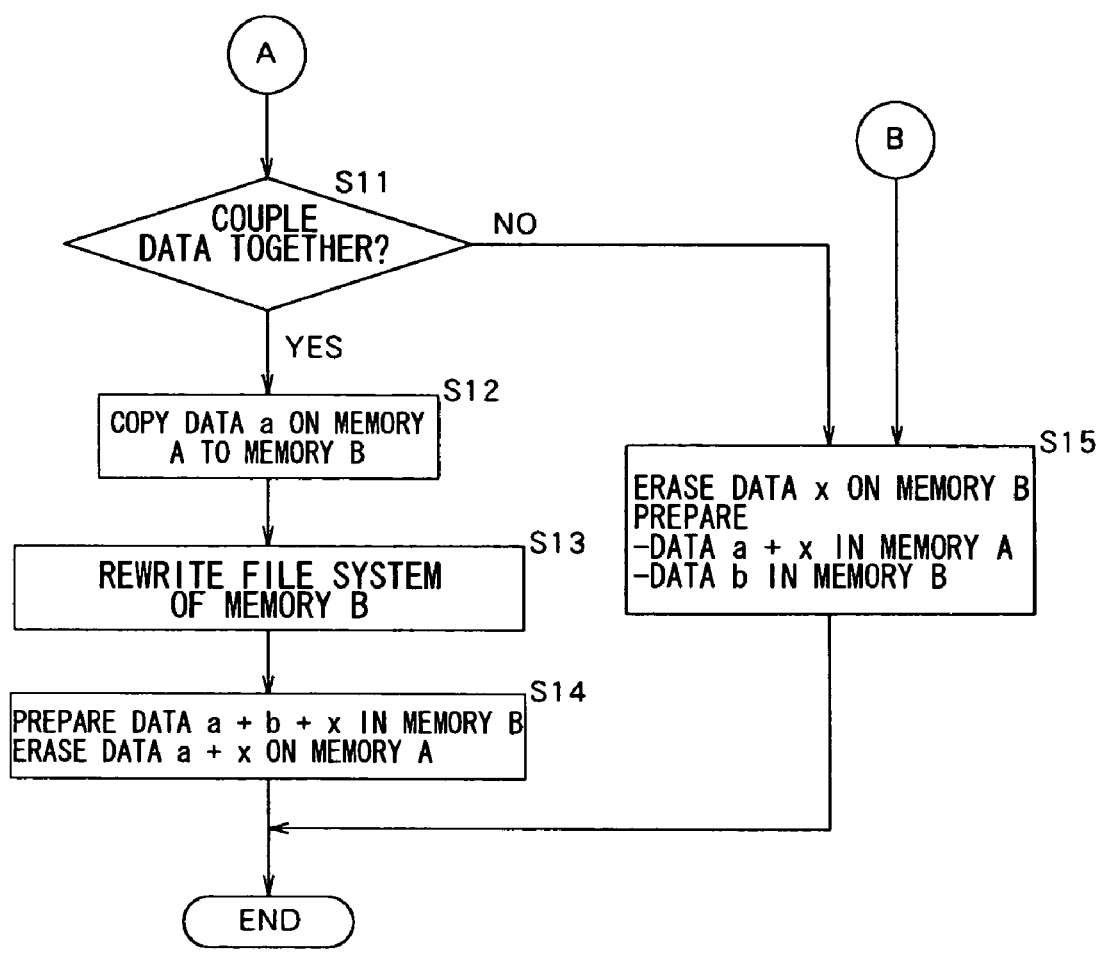
FIG. 3 is a flowchart showing a second half part of the procedure.
Figure 4:
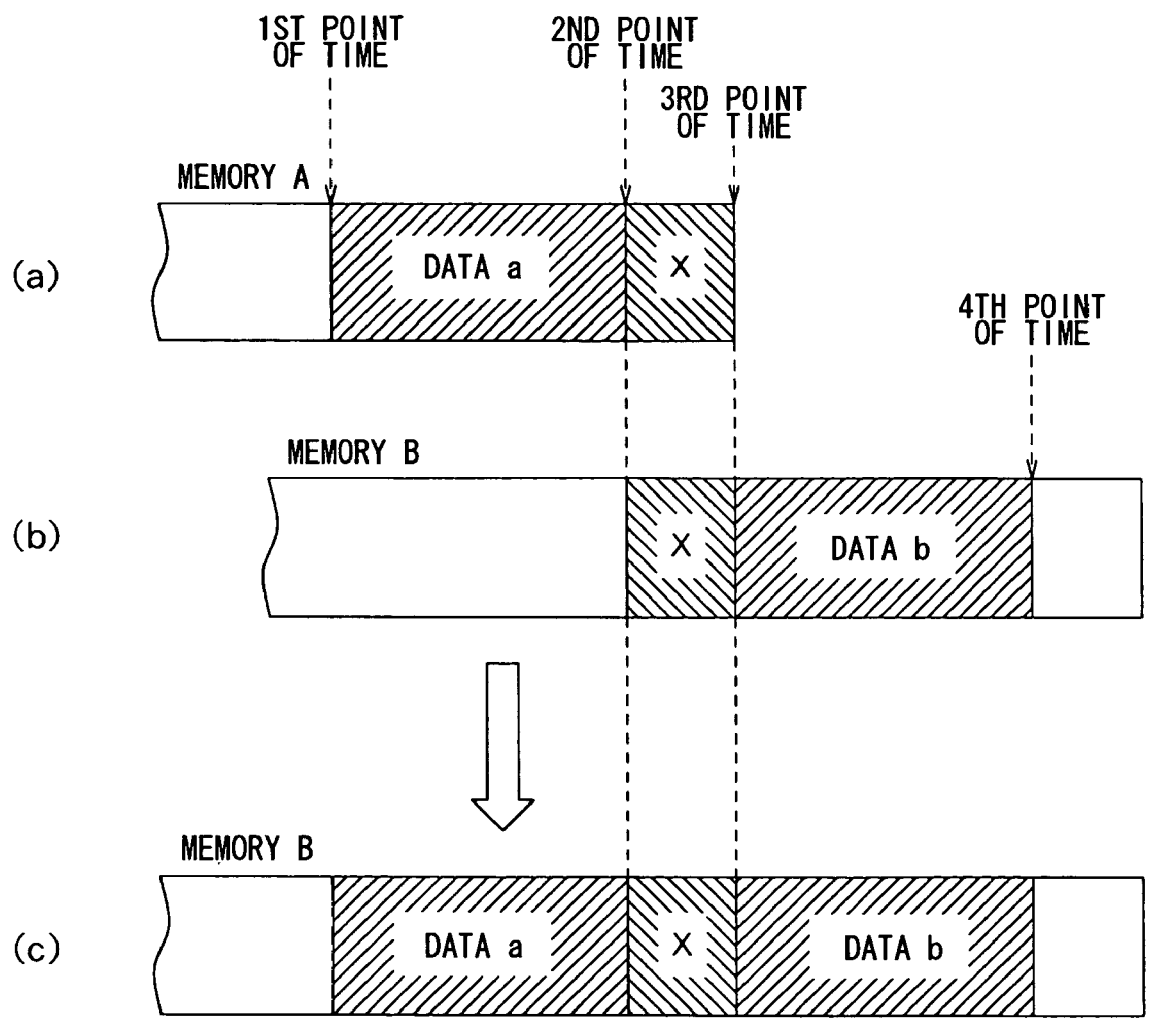
FIG. 4 is a diagram illustrating data recording states of two memories.

FIGS. 2 and 3 show a procedure of data recording control to be executed in response to a data recording command by the user. FIG. 4 shows data recording states of the flash memory A and flash memory B, respectively. In FIG. 4, a series of data to be recorded is divided into data a, data x, and data b for the convenience of description.

First, step S1 in FIG. 2 starts recording data a on the memory A. Then in step S2, an inquiry is made as to whether the remaining capacity of the memory A is not greater than a given capacity (x). Incidentally, the given capacity (x) is defined as the number of frames as data units. For example, when a bit rate is high, the number of frames of the given capacity (x) is reduced. When a bit rate is low, the number of frames of the given capacity (x) is increased.

When the answer to step S2 is negative, step S1 returns to record data a. Thereafter when the answer to step S2 is affirmative, step S3 follows to continue recording data x on the memory A concurrently with a start of recording data x on the memory B.

Subsequently in step S4, an inquiry is made as to whether the user gives a command to cease recording data x. When the inquiry is answered in the affirmative, step S6 follows to cease recording data on the two memories A and B, and thereafter erase the data x recorded on the memory B.

When the answer to step S4 is negative, step S5 follows to inquire whether the capacity of the memory A is full. If the answer is negative, step S3 returns to continue recording data on the two memories A and B.

Thereafter when the answer to step S5 is affirmative, step S7 follows to terminate recording of data on the memory A and to continue recording subsequent data b on the memory B. Next in step S8 an inquiry is made as to whether the user gives a command to cease recoding data x+b. When the answer is negative, step S7 follows again to continue recording data on the memory B.

Thereafter when the answer to step S8 is affirmative, step S9 follows to inquire whether current free space on the memory B is greater than a capacity of the data a recorded on the memory A. If the answer is affirmative, step S10 follows to present on the liquid crystal display a menu for inquiring whether the data a, x, and b are coupled together as one file to thereby urge the user to a selection.

Step S11 in FIG. 3 inquires whether the data are coupled together as one file. When the answer is affirmative, the sequence proceeds to step S12 in which the data a recorded on the memory A is copied to the memory B. Further in step S13, a file system of the memory B is rewritten to define the data a, x, and b as a series of data. Thereafter in step S14, one file including data a+x+b is prepared on the memory B to erase the data a+x recorded on the memory A, thereby terminating the procedure.

On the other hand, when an answer to step S9 in FIG. 2 is negative, or when an answer to step S11 in FIG. 3 is negative, step S15 follows to erase the data x recorded on the memory B, preparing one file including the data a+x on the memory A while preparing one file including the data b on the memory B, to thereby terminate the procedure.

According to the specific procedure described, recording data a to the memory A is started at a first point of time when a command is given to start recording data, as seen in FIGS. 4(a), (b), and (c). Data recording to the memory A is concurrent with data recording to the memory B from a second point of time when the remaining capacity of the memory A is not greater than a given capacity value x during the data recording. At a third point of time when the capacity of the memory A is full, recording data x to the memory A is ceased to continue recording data b to the memory B.

Thereafter, an inquiry is made as to whether, at a fourth point of time when a command is given to cease an operation for recording data to the memory B, free space of the memory B is greater than an amount of data a recorded on the memory A from the first point of time to the second point of time. Only when the inquiry is answered in the affirmative, the data a recorded on the memory A from the first point of time to the second point of time is copied to the memory B. A series of data a+x+b is managed as one file from the first point of time to the fourth point of time.

Accordingly, with the data recording device embodying the present invention, a series of data a, x, and b can be recorded on the flash memory A and continuously on the flash memory B without an overlap and an omission, and the series of data is managed as one file, so that the data can be handled with ease.

Furthermore, if the conventional method of recording the data continuously on the two memories A and B is necessary, the user can select such a recording method by the manipulation. Still furthermore, when data to be recorded is small and all the series of data can be recorded on the memory A, the data x recorded on the memory B is automatically erased. This can prevent waste of memory capacity consumption.

The device of the present invention is not limited to the foregoing embodiment but can be modified variously by one skilled in the art without departing from the spirit of the invention as set forth in the appended claims. For example, only the data a recorded on the memory A is copied to the memory B as seen in FIG. 4 according to the embodiment described, but the data x recorded on the memory B is erased and thereafter the data a+x on the memory A can be copied to the memory B. Moreover, any added information can be recorded in data coupling. In this case the capacity required for recording the added information need be considered.

What is claimed is:

1. A data recording device having incorporated therein or connectable thereto a plurality of storage media for digital-recording video data and/or sound data, and comprising an input device for giving a command to start and cease recording data and a control circuit for controlling data recording to the plurality of storage media, the control circuit comprising:

means for starting recording data to one storage medium A at a first point of time when a command is given to start recording data;

first judging means for judging whether the remaining capacity of the one storage medium A is not greater than a given capacity value x during data recording to the one storage medium A;

first control means for starting recording data to another storage medium B at a second point of time when it is judged that the remaining capacity of the one storage medium A is not greater than a given capacity value x, concurrently with the data recording to the one storage medium A;

second control means for terminating recording of data to the one storage medium A at a third point of time when a capacity of the one storage medium A is full or is not greater than a given capacity;

second judging means for judging whether, at a fourth point of time when a command is given to cease recording the data or data recording is automatically ceased to said another storage medium B, space capacity of said another storage medium B is greater than a data amount recorded on the one storage medium A from the first point of time to the second point of time; and third control means for, when it is judged that space capacity of said another storage medium B is greater than a data amount recorded on the one storage medium A, copying automatically or in response to a user's command the data recorded on the one storage medium A from the first point of time to the second point of time to said another storage medium B, and managing a series of data from the first point of time to the fourth point of time as one file.

2. A data recording device according to claim 1, wherein the third control means copies the data to said another storage medium B, and thereafter erases the data from the first point of time to the third point of time recorded on the one storage medium A.

3. A data recording device according to claim 1, wherein, when it is judged that space capacity of said another storage medium B is greater than a data amount recorded on the one storage medium A, in response to the user's command not to couple the data together as one file, the third control means manages as one file the data from the first point of time to the third point of time recorded on the one storage medium A, and erases the data from the second point of time to the third point of time recorded on said another storage medium B to manage the data from the third point of time to the fourth point of time as one file.

4. A data recording device according to claim 1, wherein, when a command is given to cease data recording while data is recorded to said another storage medium B during a period from the second point of time to the third point of time, the first control means erases the data recorded on said another storage medium B from the second point of time, to cease recording data to the two storage media A and B.

* * * * *